(12) United States Patent
Mulcahy et al.

(10) Patent No.: US 8,320,142 B2
(45) Date of Patent: Nov. 27, 2012

(54) LOW OUTPUT VOLTAGE CONVERTER UTILIZING DISTRIBUTED SECONDARY CIRCUITS

(75) Inventors: Gary Mulcahy, Flanders, NJ (US); John Santini, Columbia, NJ (US); Joseph Mancuso, Hackettstown, NJ (US)

(73) Assignee: Transistor Devices, Inc., Hackettstown, NJ (US)

( * ) Notice: Subject to any disclaimer, the term of this patent is extended or adjusted under 35 U.S.C. 154(b) by 244 days.

(21) Appl. No.: 12/715,123

(22) Filed: Mar. 1, 2010

(65) Prior Publication Data

US 2011/0211369 A1  Sep. 1, 2011

(51) Int. Cl.
*H02M 7/08* (2006.01)
(52) U.S. Cl. .......................................... 363/70; 363/69
(58) Field of Classification Search ................ 363/69, 363/70, 127
See application file for complete search history.

(56) References Cited

U.S. PATENT DOCUMENTS

| | | | | |
|---|---|---|---|---|
| 6,388,898 | B1 * | 5/2002 | Fan et al. | 363/20 |
| 7,318,270 | B1 * | 1/2008 | O'Loughlin | 29/605 |
| 7,463,499 | B2 * | 12/2008 | Larson, III | 363/69 |

* cited by examiner

*Primary Examiner* — Shawn Riley
(74) *Attorney, Agent, or Firm* — Doherty & Charney LLC

(57) ABSTRACT

Embodiments of the present invention relate to a low-output voltage converter, delivering voltage power less than 1 VDC, utilizing distributed secondary circuits. In one embodiment of the present invention, there is provided a voltage converter comprises a primary circuit for receiving an input voltage, comprising a plurality of primary windings arranged in series, a plurality of secondary circuits, each comprising a secondary winding for aligning with a primary winding to form a transformer, and each of the secondary circuits arranged in parallel, and an output for providing an output voltage down to, or less than 1 VDC.

21 Claims, 5 Drawing Sheets

LOW OUTPUT VOLTAGE CONVERTER UTILIZING DISTRIBUTED SECONDARY CIRCUITS

BACKGROUND OF THE INVENTION

1. Field of the Invention

Embodiments of the present invention generally relate to low-output voltage converters. More specifically, embodiments of the present invention relate to a low-output voltage converter, delivering voltage power down to, or less than, 1 VDC, utilizing distributed secondary circuits.

2. Description of the Related Art

The use of voltage converters is well known where a particular voltage is needed for a specific application and differs from the obtainable source voltage. The use of inductively coupled conductors, or transformers, for general step-up or step-down voltage control has been known in the industry for quite some time. However, as energy consumption and power control have evolved, so has the need for improved and effective power management.

Much of the attention in power management has been surrounding increased demand on large power supplies. For example, as society's need has increased for more power, the development of alternative high energy sources has been the center of attention. With the advent of nuclear power facilities, and other massive sources of energy, the focus of much of the developments in power management has been to regulate such power sources to distribute controllable levels of power throughout existing power grids.

However, over the past few decades, as computer and electrical components have become a center of consumer demand, attention has shifted to the delivery of low voltage output from an industry-standard or readily manageable voltage source. As components for computers and electrical devices become smaller and smaller, the need for more effective low output power control is becoming increasingly significant. This is particularly manifest in applications requiring a very low output voltage, i.e., around 1 VDC or less, from a standard or common input source voltage, e.g., 110 or 220 VAC.

FIG. 1 depicts a schematic of a known embodiment of a low output voltage converter. As is known in the industry, delivery of very low DC voltage power, i.e., less than 1 VDC, is often hampered by the effective control range of the power conversion circuits employed. In view of the schematic of FIG. 1, the primary circuit of a power converter may comprise an excess of circulating energy caused by transformer series leakage inductance, due to realities of flux performance from the primary winding at the transformer, and additionally due to secondary circuit wiring inductance. As the leakage inductance and secondary circuit wiring inductance increases, the efficiency of the overall system decreases, thus making constant power regulation more difficult. In addition, the increased inductance in the primary circuit will generally yield a loss of energy that potentially could be transferred on a switching cycle-by-cycle basis, thus further decreasing the efficiency of the system.

Beyond the likely energy losses in the known voltage converter of FIG. 1, issues may arise where there is a significant step down in voltage across the transformer, causing a significant increase in current through the secondary circuit. A common understanding of power conservation in a step-down voltage converter provides:

$$\frac{V_p * x}{V_s} = \frac{I_s}{I_p}$$

Where $V_p$ is the input voltage to the primary circuit, $I_p$ is the current in the primary circuit, $V_s$ is the output voltage at the secondary circuit, $I_s$ is the current in the secondary circuit, and $x$ is the efficiency factor (taking into account the aforementioned leakages, among others). Thus, assuming a constant efficiency factor, as the ratio between input to output voltage increases, the ratio of output to input current inversely increases.

In particular embodiment, for example, where a very low output is demanded (e.g., $V_s$=1 VDC) from a high source voltage (e.g., $V_p$=220 VAC), the current through the secondary circuit can be quite high. As such, in known voltage converters, the components of the secondary circuit must be sized to carry the entire output current. In many instances, this size requirement prevents the components from being capable of fitting within a particular device or housing for a device that would require such low output voltage. Therefore, the manufacturer of such known voltage converters either must manufacture large components to safely handle the expected current load or must utilize smaller components and risk a current overload, possibly resulting in excessive and dangerous heat dissipation, and possible destruction of the circuit.

Thus, there is a need for an improved low output voltage converter, utilizing distributed secondary windings for effective current regulation.

SUMMARY OF THE INVENTION

AC-DC Switching Converters generally employ a two stage approach, where one stage is utilized to convert input AC power to either regulated or unregulated DC power that is not galvanically isolated from the AC power line. The DC voltage generally resides in the range of 150-700 VDC, with the preponderance of implementations providing a voltage regulated to the 380-400 VDC range. Embodiments of the invention described in this application will run directly from AC input power, or from a DC voltage in the aforementioned range.

Embodiments of the present invention relate to a low-output voltage converter, delivering voltage power down to 1 VDC, or lower, utilizing distributed secondary circuits. In one embodiment of the present invention, a voltage converter comprises a primary circuit for receiving an AC input voltage, comprising a plurality of primary windings arranged in series, a plurality of secondary circuits, each comprising a secondary winding for aligning with a primary winding to form a transformer, and each of the secondary circuits, each comprising a rectifier and filter, arranged in parallel, and an output for providing an output voltage down to, or less than 1 VDC.

In another embodiment of the present invention, a voltage converter for converting high voltage DC to galvanically isolated, low voltage DC, comprises a primary circuit for receiving an input voltage of between about 150 VDC to about 400 VDC, or 250 VDC to 700 VDC, the primary circuit comprising a high frequency switching inverter circuit and plurality of primary windings arranged in series, a plurality of secondary circuits arranged in parallel, each comprising a plurality of secondary windings for aligning with a plurality of primary windings to form a plurality of transformers, and each comprising a rectifier and filter for converting an input AC voltage signal to an output DC voltage signal, and an output for providing an output voltage of down to, or less than 1 VDC.

In yet another embodiment, a method for converting an AC power source to a low-voltage DC output comprises providing a power converter comprising: a primary circuit for receiving AC input voltage and converting it to a non-galvanically isolated DC voltage, and a galvanically isolated DC-DC converter comprising a high frequency switching inverter along with a plurality of primary windings arranged in series; a plurality of secondary circuits arranged in parallel, each comprising a secondary winding for aligning with a primary winding to form a transformer, and each of the secondary circuits comprising a rectifier and filter for converting an input AC voltage signal to an output DC voltage signal; and an output for providing an output voltage of down to, or less than 1 VDC, and supplying the input voltage to the primary circuit, the input voltage ranging between about 100 VAC and about 330 VAC, or about 380 VAC and about 500 VAC.

BRIEF DESCRIPTION OF THE DRAWINGS

So the manner in which the above recited features of the present invention can be understood in detail, a more particular description of embodiments of the present invention, briefly summarized above, may be had by reference to embodiments, which are illustrated in the appended drawings. It is to be noted, however, the appended drawings illustrate only typical embodiments of embodiments encompassed within the scope of the present invention, and, therefore, are not to be considered limiting, for the present invention may admit to other equally effective embodiments, wherein.

Figure 1:
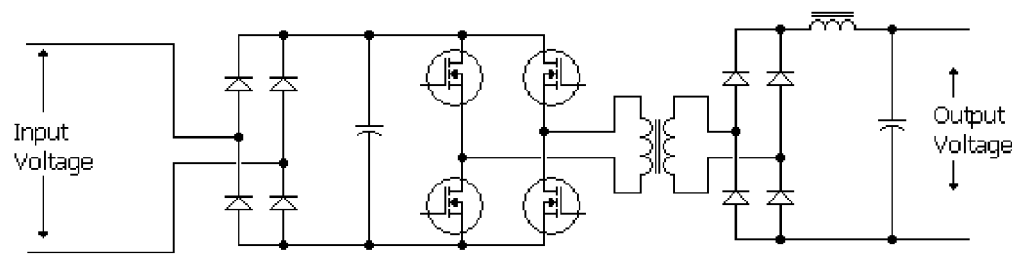
FIG. 1 depicts a schematic of a known type of voltage converter for low voltage output.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

DETAILED DESCRIPTION

Figure 2:
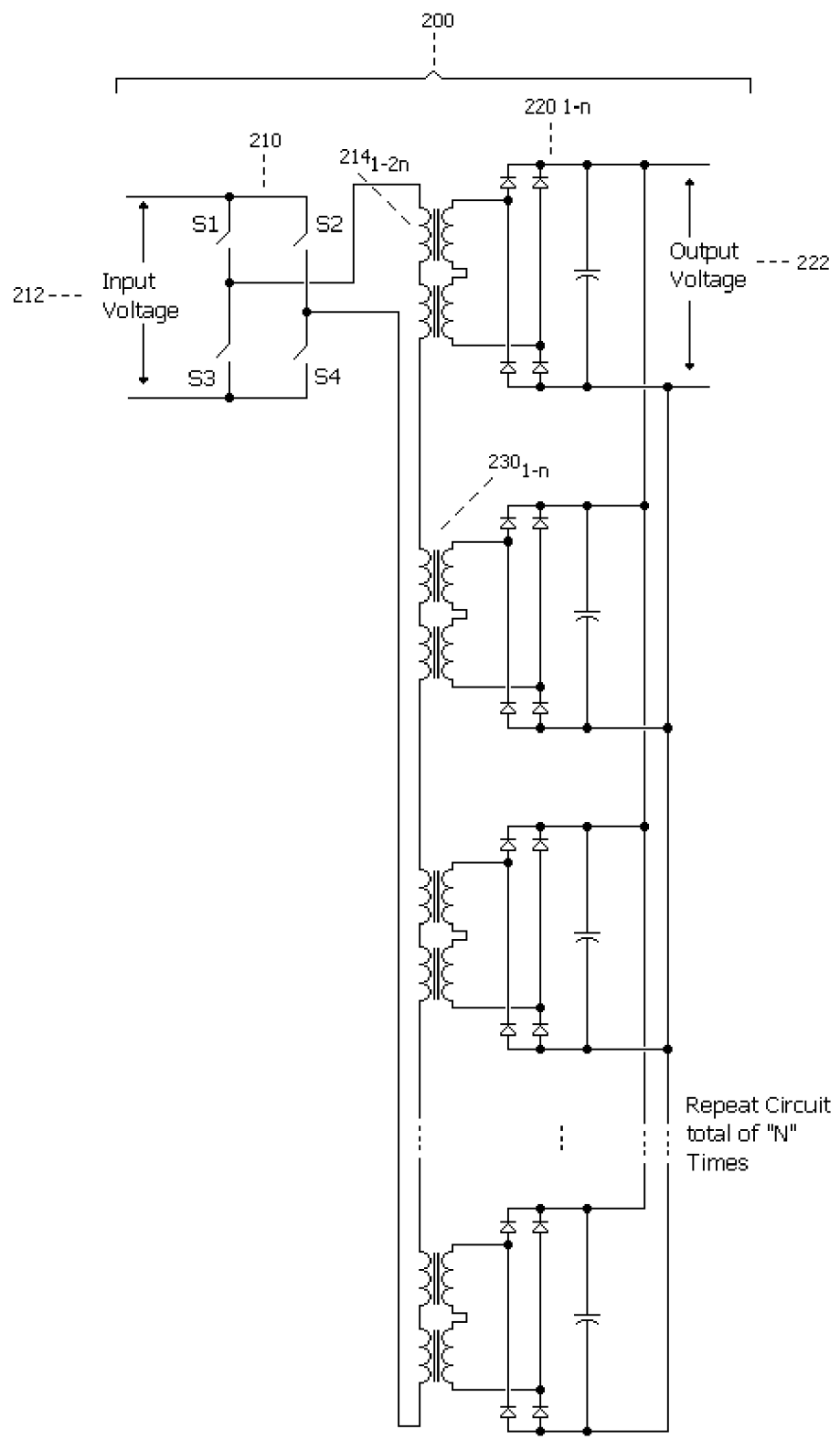
FIG. 2 depicts a schematic of a voltage converter in accordance with one embodiment of the present invention.

Embodiments of the present invention relate to a low-output voltage converter, delivering voltage power down to, or less than 1 VDC, utilizing distributed secondary circuits. FIG. 2 depicts a schematic of a voltage converter, in accordance with the first aforementioned embodiment of the present invention. As shown in the Figure, the voltage converter 200 generally comprises a primary circuit 210 and a plurality of secondary circuits $220_{1-n}$, where n represents any number of secondary circuits suitable for embodiments of the present invention.

In many embodiments, the primary circuit 210 comprises an input voltage 212, a plurality of control switches S1, S2, S3, S4, and a plurality of primary windings $214_{1-2n}$, where n represents the number of secondary circuits.

The input voltage 212 may generally comprise a common or industry-standard voltage, for example, 110 or 220 VAC from a high voltage source, for example, certain military power sources, in which the input voltage 212 may be as high as 30 kV or higher. In most embodiments, however, the input voltage 212 may range from between about 100 VAC to about 500 VAC. In one particular embodiment, the input voltage 212 comprises at least one of approximately 100, 115, 208, 230, 380, 440, or 480 VAC, as obtained from generally available utility power feeds.

The plurality of control switches S1, S2, S3, S4 of the primary circuit are optional and may be provided as necessary, to regulate the flow of power from the power source (not shown) to each of the secondary circuits $220_{1-n}$ within the voltage converter 200. As shown in the Figure, each switch generally comprises a Single Pole, Single Throw (SPST) switch, which allows current to flow only when the switch is in a closed, i.e., on, position. In many embodiments, these switches are regulated via a controller (not shown), operating in accordance with the drive pulse of the common phase operation between the primary and secondary circuits to maintain constant bi-directional current flow through the primary windings $214_{1-2n}$. Such controllers are generally realized with phase-controlled, silicon controlled rectifiers, or computer controlled, bi-directional silicon switches.

The plurality of primary windings $214_{1-2n}$ of the primary circuit 210 each comprise the primary half of multiple transformers $230_{1-2n}$. As shown in the Figure, the plurality of primary windings $214_{1-2n}$ are provided in series with one another, such that the current through each of the windings is substantially identical. As understood by embodiments of the present invention, to obtain identical current, each of the primary windings is substantially identical, such that winding composition, number of coils, etc., are substantially identical to one another.

In one embodiment of the present invention, the primary windings $214_{1-2n}$ comprise copper wire material. However, in accordance with alternative embodiments of the present invention, the primary windings may comprise any suitable material for embodiments of the present invention, including: steel, nickel, zinc, aluminum, silver, as well as combinations, blends and alloys thereof, and the like.

Similarly, in many embodiments, the multiple transformers $230_{1-2n}$ are substantially identical to one another, and generally comprise an iron-based core, as depicted in the Figure. In alternative embodiments, however, any type of transformer core may be utilized, including: cobalt, cobalt alloys, silicon, silicon steel, nickel, nickel iron, iron alloys, powder iron, ferrous alloys such as "Sendust,"—commercially available from Arnold Engineering, Inc., molybdenum, ceramics, manganese, zinc, and alloys or combinations of any of the above, or the like. The transformer core may also take any shape feasible for embodiments of the present invention. In most embodiments, however, the transformer core comprises a structure readily adaptable to printed wiring board mounting, leveraging the small physical size enabled by this invention.

The secondary circuits $220_{1-n}$ are connected within the power converter 200 in parallel, such that there is constant output voltage 222 from each of the secondary circuits $220_{1-n}$.

Figure 3:
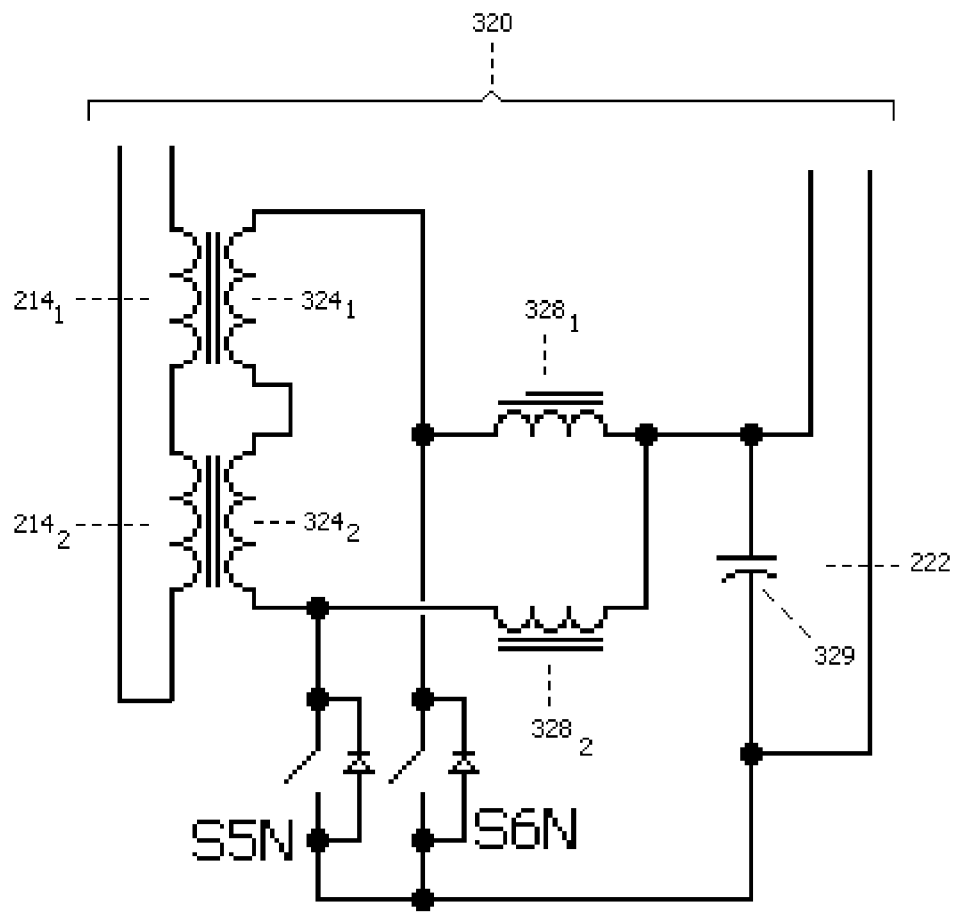
FIG. 3 depicts a schematic of a single secondary circuit for a voltage converter in accordance with one exemplary embodiment of the present invention.
Figure 4:
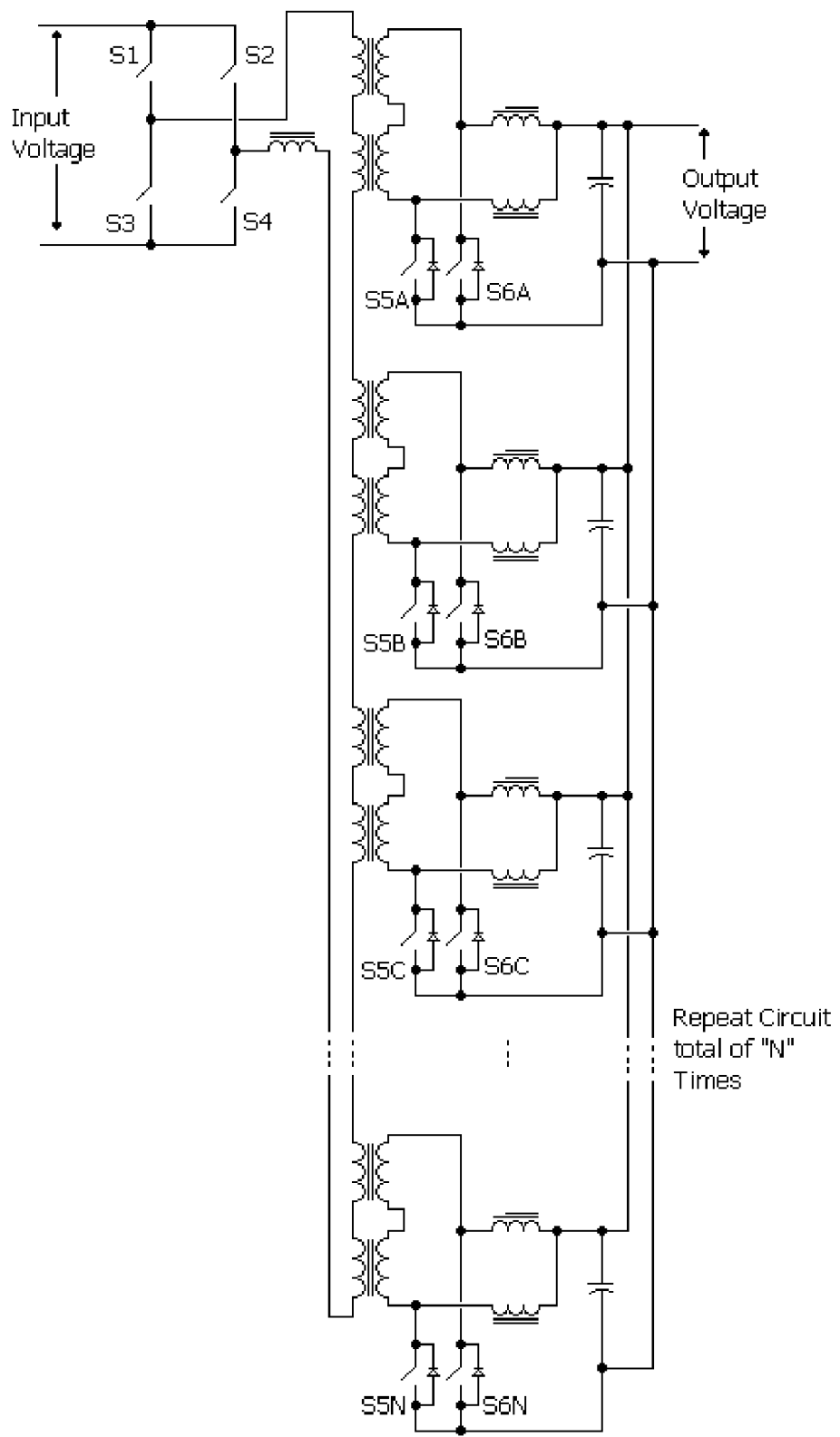
FIG. 4 depicts a schematic of a voltage converter in accordance with one exemplary embodiment of the present invention.
Figure 5:
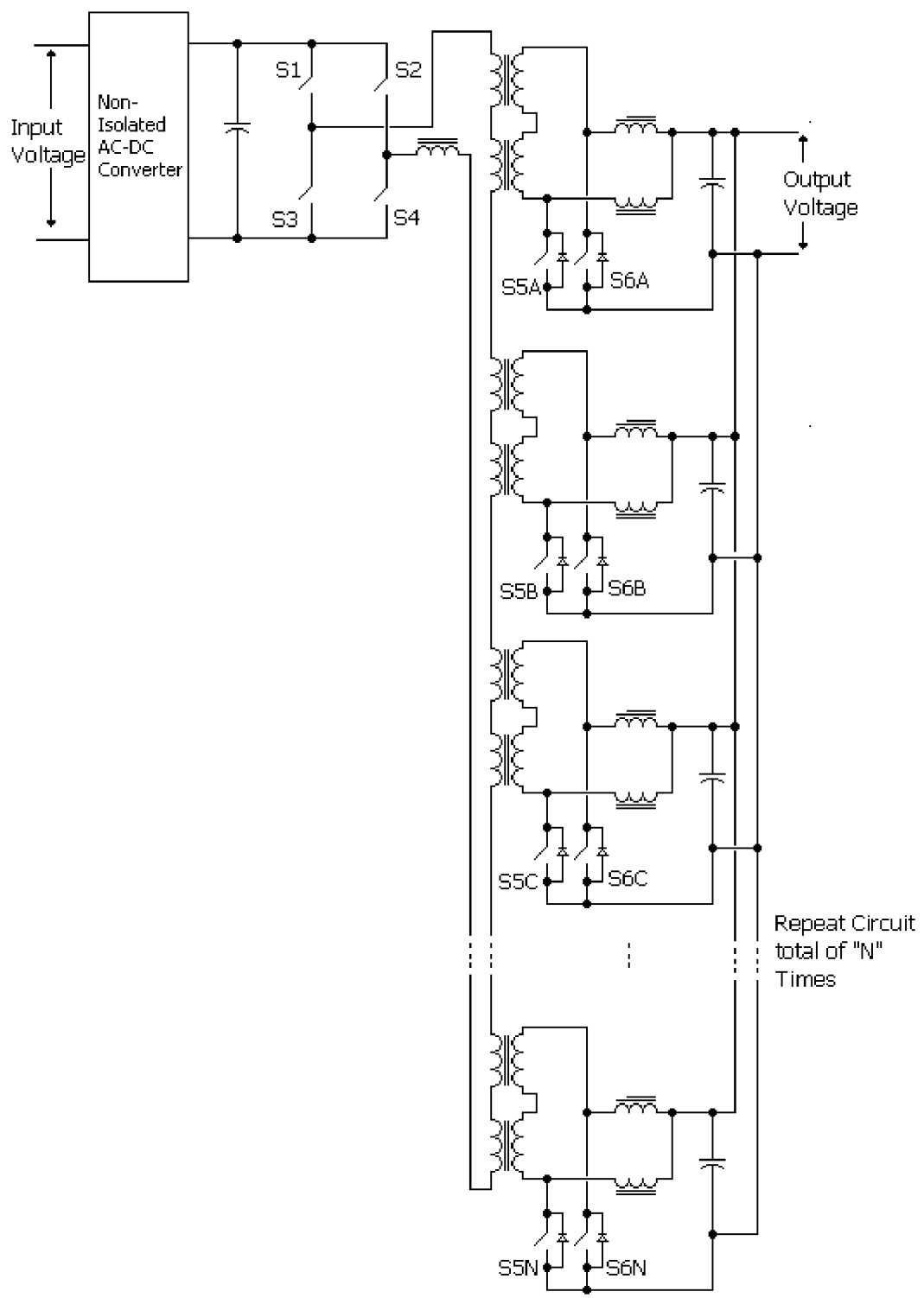
FIG. 5 depicts a schematic of a voltage converter in accordance with another exemplary embodiment of the present invention.

Whereas each of the secondary circuits is substantially identical to one another, reference is made to FIG. 3, depicting a schematic of a single secondary circuit in a voltage converter, in accordance with one exemplary embodiment of the present invention.

The secondary circuit 320 generally comprises a set of secondary windings $324_{1\text{-}2}$, each aligned with a set of primary windings $214_{1\text{-}2}$ from the primary circuit 210, to form a set of transformers $230_{1\text{-}2}$ as discussed in FIG. 2 above. In many embodiments, the set of secondary windings $324_{1\text{-}2}$ comprises a similar material composition to the primary windings $214_{1\text{-}2}$, and may include any of the material compositions as disclosed above.

The number of coils providing within each secondary winding is generally dependent upon the intended application of the power converter 200, and the necessary step-down voltage between the input voltage 212 and the output voltage 222. In many embodiments, the number of coils required in each secondary winding can be determined by applying:

$$\frac{V_s * N_p}{V_p * x} = N_s$$

where Vs is output voltage, Vp is the input voltage, Np is the number of coils/turns in the primary winding, and Ns is the number of coils in the secondary winding, and x is the efficiency factor, said efficiency factor which takes into account any switching regulator effects. Whereas the ratio of coils between the primary and secondary windings determine the voltage conversion, it is appreciated that commercial embodiments of the present invention are generally designed for a particular application, or must be redesigned to accommodate a new application. In the particular case of output voltages at or around 1 VDC, it is generally possible to realize the secondary winding with one turn, thus facilitating the design of optimally small and compact transformer.

Returning to FIG. 3, the secondary circuit 320 may additionally comprise a rectifier 326 for converting the alternating current input voltage from the secondary windings $324_{1\text{-}2}$ to a direct current voltage, as desired by the output device (not shown). The rectifier 326 may comprise any suitable configuration for embodiments of the present invention. In one embodiment, the rectifier 326 comprises full-wave rectification components, as shown in FIG. 3. Alternatively, the rectifier 326 may be designed for half-wave rectification, although such non-continuous output production may not be desirable for certain applications.

In one embodiment, the rectifier 326 comprises a plurality of diodes, for example, silicon diodes. In certain embodiments, Schottky diodes may be utilized as the used as the rectifier 326 elements given improved performance over silicon diodes at low-voltage outputs. Alternatively, a metal-oxide-semiconductor field-effect transistor, i.e., MOSFET, may be utilized in combination with this type of part's intrinsic body diode as a rectifier element to yield desirable results for very-low voltage output. The rectifier 326 may work in combination with one or more switches, for example, switches S5 and S6. In such an embodiment, the control of the switches S5 and S6 may occur through a controller (not shown). In one embodiment, the controller may operate in accordance with the common drive pulse of the common phase operation between the primary and secondary circuits.

Once the voltage signal has been passed through the rectifier 326, the signal may be filtered and smoothed by utilizing inductors $328_{1\text{-}2}$ and a capacitor 329. The resulting voltage, or output voltage 222, comprises a substantially stable DC voltage, at approximately the desired level.

In operation, once the input voltage 212 is supplied to the voltage converter 200, all of the secondary windings 324 are fed with a substantially uniform power transfer pulse through the transformers 230. Whereas the primary windings 214 are in series, equal secondary currents are provided through each of the secondary circuits 220.

In order to regulate the current flow through the components of the secondary circuits, and in turn regulate heat dissipation and potential damage to circuit components, the number of secondary circuits may be selected. The common current passing through each of the secondary circuits, or the optimal number of secondary circuits may be calculated using:

$$I_s = I_o/N \text{ or } N = I_o/I_s$$

Where $I_s$ is the current through each of the secondary circuits, $I_o$ is the current passing through each of the primary windings in series, and N is the number of secondary circuits in the power converter.

Utilizing the above equation, the components within the secondary circuits of embodiments of the present invention can be made significantly smaller and spread over a geometric area that provides a circuit designer with many options regarding heat management.

In accordance with many embodiments of the present invention, the output voltage of voltage converters disclosed herein is generally on the order of 1 VDC or less. By utilizing the components and system construction disclosed herein, more desirable efficiency is obtainable for such low-voltage output in a voltage converter. Moreover, by allowing a circuit designer the ability to control thermal dissipation via known current distribution through the secondary components, the ability to utilize smaller elements within the system exists without fear of overheating.

It should be emphasized that the above-described embodiments of the present invention are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A voltage converter comprising:
   a primary circuit for receiving an input voltage, the primary circuit comprising a plurality of primary windings arranged in series;
   a plurality of secondary circuits, each of the secondary circuits comprising a secondary winding for aligning with a primary winding to form a transformer, and each of the secondary circuits arranged in parallel, wherein each one of the secondary windings is aligned with a different one of the primary windings; and
   an output for providing an output voltage of down to, or less than, 1 VDC.

2. The voltage converter of claim 1, wherein the input voltage ranges between about 100 VAC and about 330 VAC, or between about 380 VAC and about 500 VAC.

3. The voltage converter of claim 1, wherein the input voltage is between about 150 VDC to about 400 VDC, or between about 250 VDC to about 700 VDC.

4. The voltage converter of claim 1, wherein the input voltage comprises at least one of approximately 100, 115, 208, 230, 380, 440, or 480 VAC.

5. The voltage converter of claim 1, wherein each of the plurality of secondary circuits further comprise a plurality of secondary windings for aligning with a plurality of primary windings to form a plurality of transformers.

6. The voltage converter of claim 1, wherein each of the plurality of secondary circuits further comprise a rectifier and filter for converting an input AC voltage signal to an output DC voltage signal.

7. The voltage converter of claim 6, wherein the filter of each of the plurality of secondary circuits further comprise a capacitor or an inductor and a capacitor for filtering a rectified signal.

8. The voltage converter of claim 6, wherein the rectifier comprises full-wave or half-wave rectification components.

9. The voltage converter of claim 1, wherein each of the plurality of secondary circuits further comprise a controller for activating at least a switch.

10. The voltage converter of claim 9, wherein the controller operates in accordance with a common drive pulse of a common phase operation between the primary circuit and the plurality of secondary circuits.

11. A voltage converter comprising:
a primary circuit for receiving an input voltage of between about 150 VDC to about 400 VDC, or between about 250 VDC and about 700 VDC, the primary circuit comprising a plurality of primary windings arranged in series as well as a common switching regulator that feeds said windings;
a plurality of secondary circuits arranged in parallel, each comprising a plurality of secondary windings for aligning with a plurality of primary windings to form a plurality of transformers, and each comprising a rectifier for converting an input AC voltage signal to an output DC voltage signal, wherein each one of the secondary windings is aligned with only one of the primary windings and each one of the primary windings is aligned with only one of the secondary windings; and
an output for providing an output voltage of less than or equal to 1 VDC.

12. The voltage converter of claim 11, wherein the input voltage is about 400 VDC or about 700 VDC.

13. The voltage converter of claim 11, wherein each of the plurality of secondary circuits further comprise an inductor and a capacitor for filtering a rectified signal.

14. The voltage converter of claim 11, wherein the rectifier comprises full-wave or half-wave rectification components.

15. The voltage converter of claim 11, wherein each of the plurality of secondary circuits further comprise a controller for activating at least a switch.

16. The voltage converter of claim 15, wherein the controller operates in accordance with a common drive pulse of a common phase operation between the primary circuit and the plurality of secondary circuits.

17. A method for converting an AC power source to a low-voltage DC output comprising:
providing a power converter comprising
a circuit for receiving an AC input voltage and converting it to a non-galvanically isolated DC voltage, said voltage being delivered to a primary circuit, the primary circuit comprising a plurality of primary windings arranged in series, as well as a common switching regulator that feeds said windings,
a plurality of secondary circuits arranged in parallel, each of the secondary circuits comprising a secondary winding for aligning with a primary winding to form a transformer, wherein each one of the secondary windings is aligned with only one of the primary windings and each one of the primary windings is aligned with only one of the secondary windings, and each of the secondary circuits comprising a rectifier for converting an input AC voltage signal to an output DC voltage signal, and
an output for providing an output voltage of less than or equal to 1 VDC; and
supplying the input voltage to the primary circuit, the input voltage ranging between about 100 VAC and about 330 VAC, or between about 380 VAC and about 500 VAC.

18. The method of claim 17, wherein the input voltage comprises at least one of approximately 100, 115, 208, 230, 380, 440, or 480 VAC.

19. The method of claim 17, further comprising:
controlling the current through each of the secondary circuits as a function of a primary circuit current, by providing N secondary circuits for Ip/Is, wherein Ip is the primary circuit current and Is is the desired secondary circuit current for each of the secondary circuits.

20. The method of claim 17, wherein each of the plurality of secondary circuits further comprise an inductor and a capacitor for filtering a rectified signal.

21. The method of claim 20, wherein the rectifier comprises full-wave or half-wave rectification components.

* * * * *